United States Patent [19]

Littlefield

[11] Patent Number: 4,988,906

[45] Date of Patent: Jan. 29, 1991

[54] MAGNETIC BEARING ASSEMBLY

[75] Inventor: David E. Littlefield, Lake Jackson, Tex.

[73] Assignee: The Dow Chemical Company, Midland, Mich.

[21] Appl. No.: 410,175

[22] Filed: Sep. 20, 1989

Related U.S. Application Data

[63] Continuation-in-part of Ser. No. 241,652, Sep. 8, 1988, abandoned.

[51] Int. Cl.⁵ ............................................. F16C 39/06
[52] U.S. Cl. .................................................. 310/90.5
[58] Field of Search ......................... 310/90.5; 415/10; 416/170 R; 277/80; 188/314, 322.19, 261, 290

[56] References Cited

U.S. PATENT DOCUMENTS

| | | | |
|---|---|---|---|
| 2,585,714 | 2/1952 | Wrobel et al. | 310/90.5 |
| 3,746,407 | 7/1973 | Stiles et al. | 310/90.5 |
| 4,312,628 | 1/1982 | Yamamura | 310/90.5 |
| 4,527,802 | 7/1985 | Wilcock et al. | 310/90.5 |
| 4,541,772 | 9/1985 | Becker | 310/90.5 |

FOREIGN PATENT DOCUMENTS 1382300 1/1975 United Kingdom ............... 310/90.5

Primary Examiner—R. Skudy

[57] ABSTRACT

A passive magnetic bearing assembly for a rotating shaft including:
a. a journal subassembly suitable for mounting to the shaft so as to rotate with the shaft, the journal subassembly comprising a housing forming a chamber containing a journal magnetic material, a flexible fluid-filled hollow member which compensates for changes in the unoccupied volume within the chamber due to thermal expansion and changes in internal pressure, and a damping fluid in the chamber; and
b. a bearing subassembly annularly and concentrically disposed around the journal subassembly such that a clearance is formed between the bearing and journal subassemblies, the bearing subassembly comprising a housing forming a chamber containing a bearing magnetic material, a flexible hollow fluid-filled member which compensates for changes in the unoccupied volume within the chamber due to thermal expansion and changes in internal pressure, and a damping fluid in the chamber.

10 Claims, 6 Drawing Sheets

MAGNETIC BEARING ASSEMBLY

CROSS-REFERENCE TO RELATED APPLICATION

This is a continuation-in-part of pending application Ser. No. 07/241,652 filed Sept. 8, 1988.

BACKGROUND OF THE INVENTION

This invention relates to a magnetic bearing assembly and a container device for mounting and protecting magnetic bearings.

Active electromagnetic bearings are used, for example, to support a rotor in a compressor or to replace oil lubricated bearings in turbomachinery. The active electromagnetic bearings are relatively expensive and require a control system to control power to the electromagnets. There is ongoing research to develop active electromagnetic bearings for application in sealless pumps.

Passive magnetic bearings have not been used for industrial equipment because passive magnetic bearings inherently have no damping properties and, as such, are not suitable for application in dynamic industrial equipment such as compressors, turbines, pumps, motors and other rotating equipment. Normally, these type of industrial equipment applications utilize a "hydrodynamic bearing" system in which damping is provided by a hydrodynamic film. In a sealless pump application, for example, the hydrodynamic fluid is the product being pumped. However, the pumped product provides poor lubrication properties, i.e., low viscosity and relatively high vapor pressure. A problem with product lubricated bearings in sealless pumps is that the pumps readily break down due to bearing damage resulting from the poor lubricating properties of the product.

Heretofore, a combination of a hydrodynamic bearing and a passive magnetic bearing has not been used. It is desired, therefore, to enhance the load carrying capacity of product lubricated hydrodynamic bearings by incorporating a passive magnetic bearing into the hydrodynamic bearing system.

Also, heretofore, it was not possible to use passive magnetic bearings in a corrosive environment because the magnetic material would degrade in contact with the corrosive fluid. It is desired therefore to provide a housing or container to protect the magnetic material and allow the operation of the magnetic bearings in a corrosive environment.

It is further desired to provide a container that will compensate for differing thermal growths and pressure differentials when in operation. It is desired that the volume inside the container walls remain unchanged despite differing thermal growths and pressure differentials across the container walls.

In prior art hydrodynamic bearings systems, a journal and bearing are separated by a hydrodynamic film. It is desired to provide a passive magnetic bearing with an additional separating force between journal and bearing members to provide support between these parts and to minimize contact between these parts and thus minimize breakdown of these parts. It is further desired to provide a product filled clearance gap which will provide damping. It is desired to provide clearances designed relatively large to allow larger particles to pass through without damage to the bearing.

It is further desired to provide an assembly for use in substantially all sealless pumps such as in canned motor pumps and in magnetic drive pumps with operating temperatures such that the Curie temperature of the magnets is not exceeded.

It is desired to provide a device which is useful for minimizing the deformation of the container walls due to pressure differential across the container walls of the magnetic bearings, and for maintaining a uniform bearing concentricity and a uniform clearance gap for fluid flow between journal and bearing members.

SUMMARY OF THE INVENTION

One aspect of the present invention is directed to a passive magnetic bearing assembly for a rotating shaft comprising:

a. a journal subassembly suitable for mounting to the shaft so as to rotate with the shaft, the journal subassembly comprising a housing forming a chamber containing a journal magnetic material, a flexible fluid-filled hollow member which compensates for changes in the unoccupied volume within the chamber, and a damping fluid in the chamberl and b. a bearing subassembly annularly and concentrically disposed around the journal subassembly such that a clearance is formed between the bearing and journal subassemblies, the bearing subassembly comprising a housing forming a chamber containing a bearing magnetic material, a flexible hollow fluid-filled member which compensates for changes in the unoccupied volume within the chamber, and a damping fluid in the chamber.

Another aspect of the present invention is directed to a container device for mounting and protecting a passive magnetic bearing in a non-magnetic housing useful, for example, in canned motor pumps; the housing containing a damping fluid and a flexible gas-filled tube which compensates for changes in the unoccupied volume within the container due to thermal expansion and changes in pressure within the container.

DETAILED DESCRIPTION OF THE PREFERRED EMBODIMENT(S)

Figure 1:
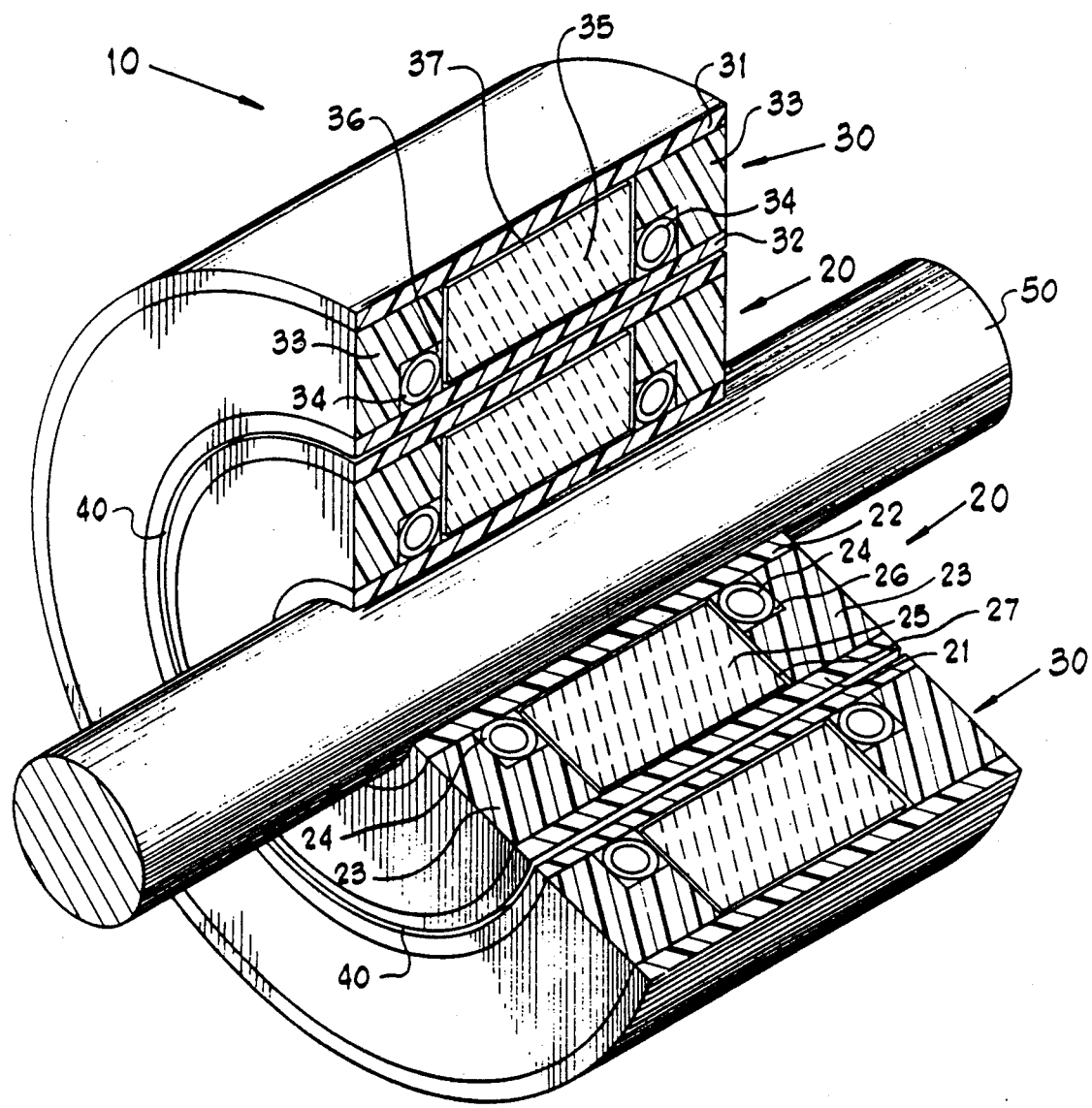
FIG. 1 is a perspective, partially in cross-section view showing the container device of the present invention disposed about a rotating shaft.
Figure 2:
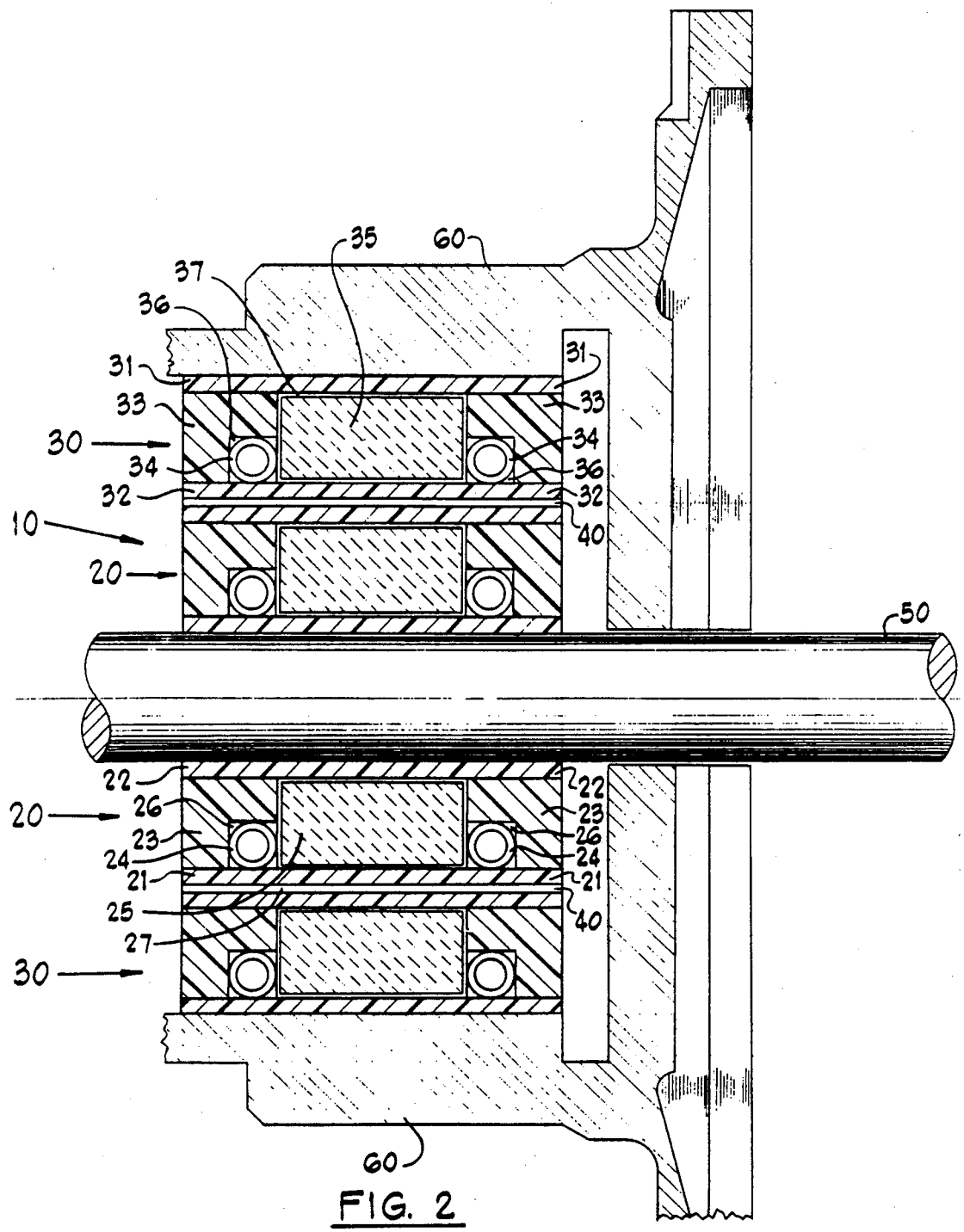
FIG. 2 is a side, partially in cross-section view showing the container device of the present invention disposed about a rotating shaft.
Figure 3:
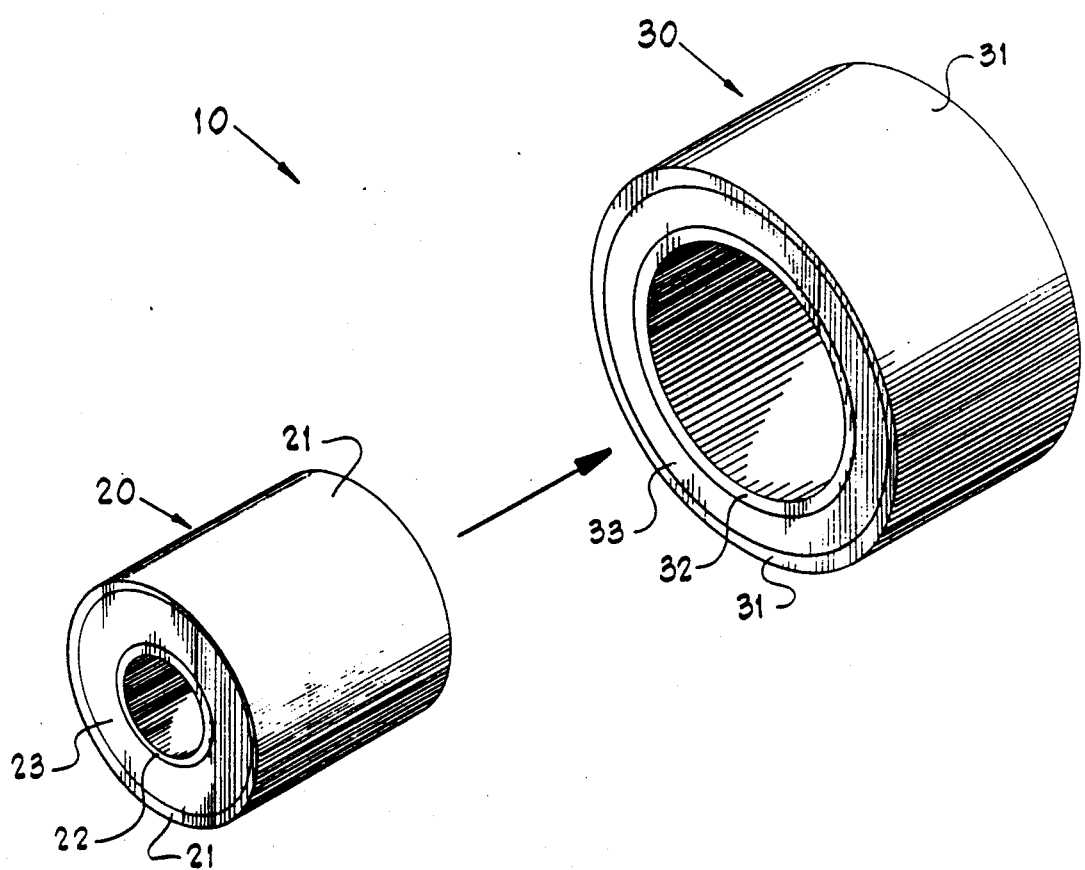
FIG. 3 is a perspective, partially exploded view showing the container device of the present invention.
Figure 4:
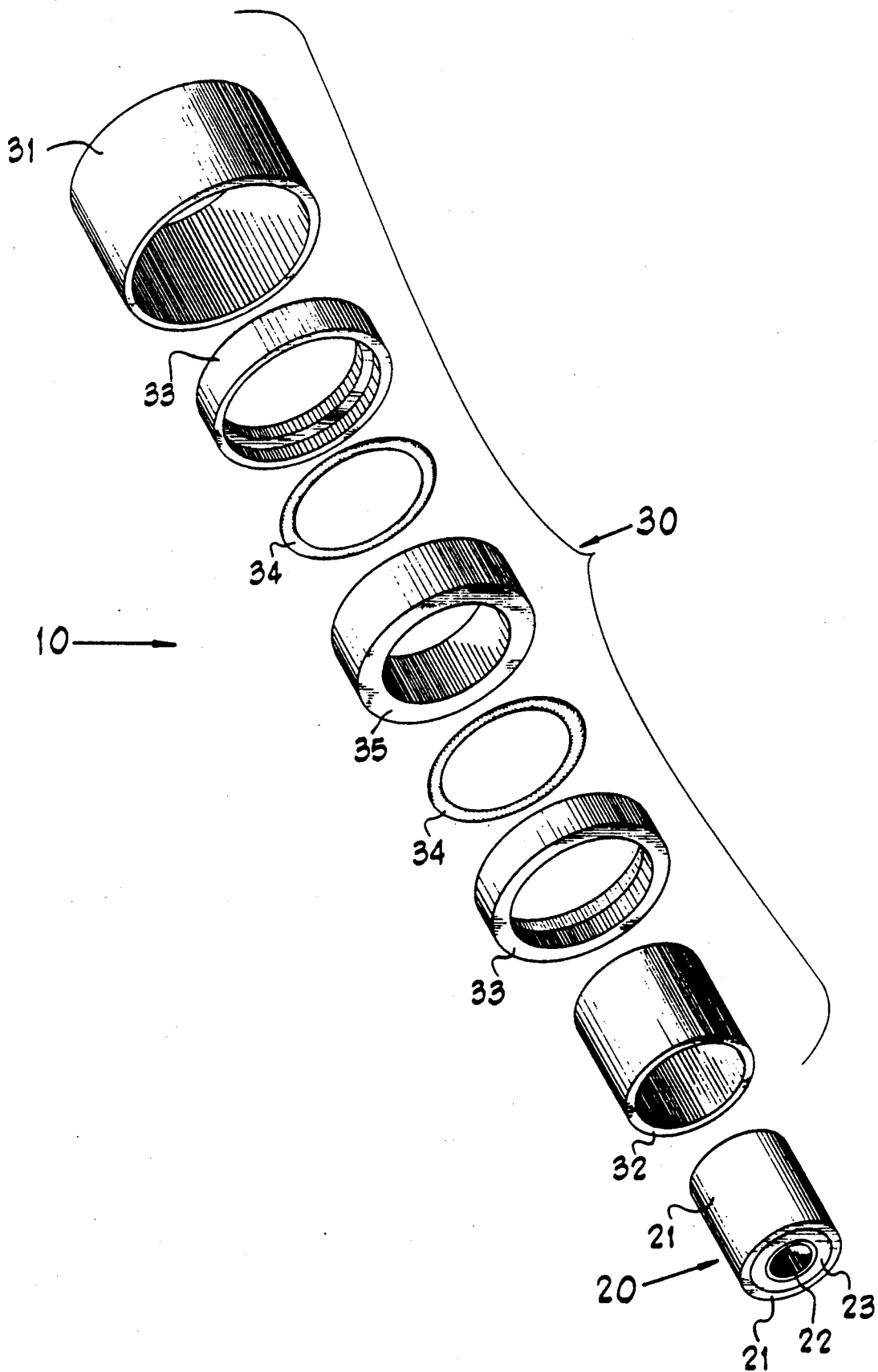
FIG. 4 is a perspective, partially exploded view showing the container device of the present invention.

With reference to FIGS. 1-4, there is shown a magnetic bearing assembly, generally indicated by numeral 10, mounted onto a shaft 50.

An inner rotative journal subassembly (herein journal subassembly 20) is rotatably interposed within an outer stationary bearing subassembly (herein bearing subassembly 30) such that the journal subassembly 20 is concentrically disposed in the outer bearing 30 and the bearing subassembly 30 is annularly disposed on the journal subassembly 20. A clearance gap 40 is present when the subassemblies 20 and 30 are concentrically arranged and in operation.

The subassemblies, 20 and 30, respectively, are preferably constructed of identical elements except that the journal subassembly 20 is smaller in size than the bearing subassembly 30 sufficient to fit concentrically within the bearing subassembly 30.

The journal subassembly 20, for example, comprises a first outer non-magnetic cylindrical shell member 21, a second inner non-magnetic cylindrical shell member 22, non-magnetic end ring wall member 23, flexible hollow members 24 such as tubing and a permanent magnetic material 25.

The bearing subassembly 30 (shown in more detail in FIG. 4), for example, comprises a first outer non-magnetic cylindrical shell member 31, a second inner non-magnetic cylindrical shell member 32, non-magnetic end ring wall members 33, flexible hollow members 34 such as tubing and a permanent magnetic material 35.

Figure 6:
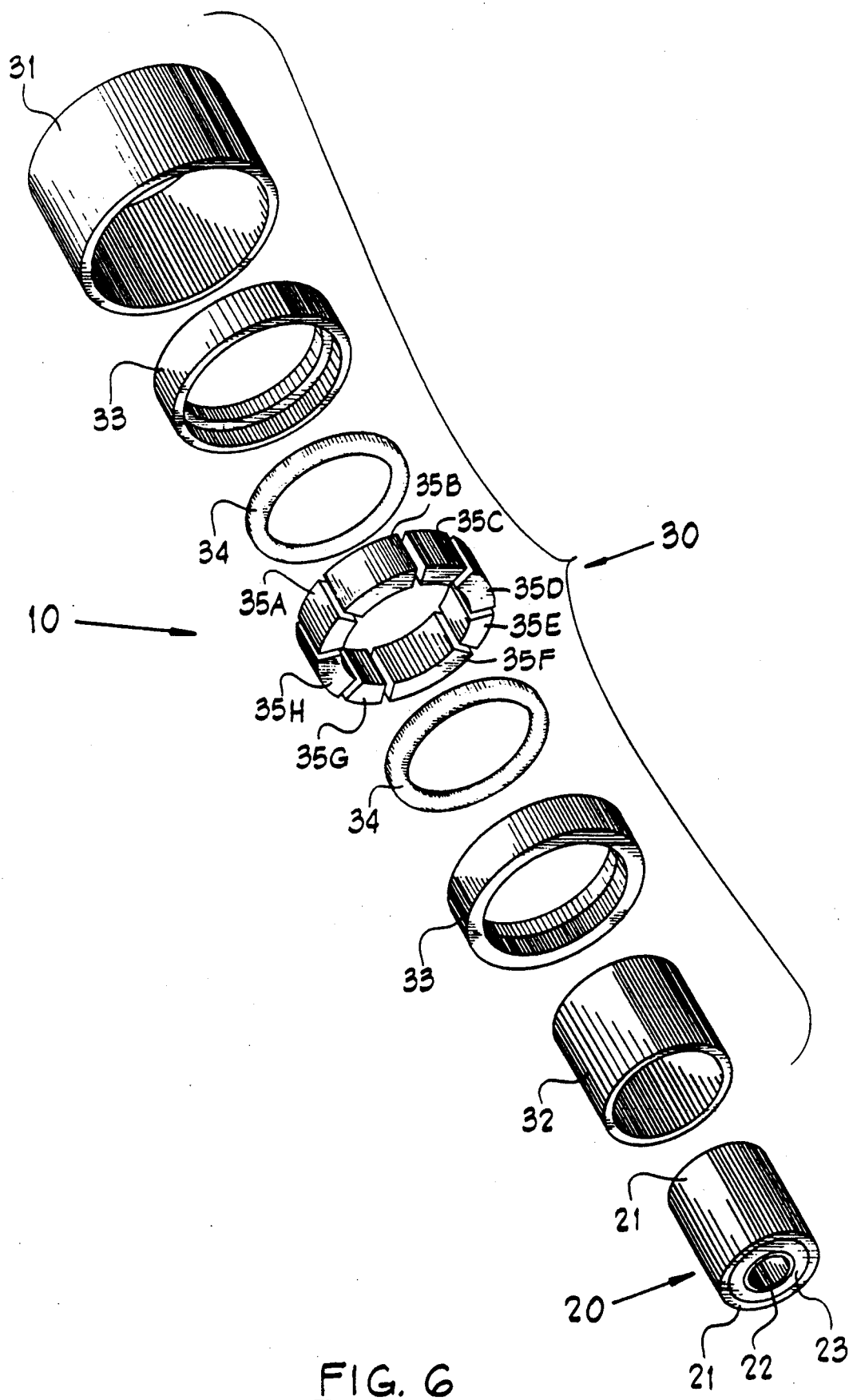
FIG. 6 is a perspective view showing an alternate embodiment of the container device of the present invention.

The magnetic materials 25 and 35 are, preferably, cylindrical or ring-shaped members interposed between the outer and inner shell members 22 and 32 and 21 and 31 of the subassemblies 20 and 30, respectively. The magnetic material may also include a plurality of pole pieces, for example, pole pieces 35A, 35C, 35E and 35G, separate and apart from each other and not necessarily as a continuous ring member in a circular pattern interposed between the inner and outer shell members 22 and 32 as shown in FIG. 6. Spacer members 35B, 35D, 35F, and 35H, which can be made for example of non-magnetic material, may be used to space the magnetic material pole pieces apart as shown in FIG. 6. The magnetic material includes, for example, ceramic and rare earth elements/iron alloys.

When the subassemblies 20 and 30 are assembled, the ring members 23, 33 establish a leak tight seal between inner and outer cylindrical shell members 21, 31 and 22, 32, respectively. The ring members 23, 33 further secure the hollow members 24, 34 and the magnetic member 25, 35 in place in the axial direction within the inner and outer shell members 21, 31 and 22, 32. Also, the ring members 23, 33 complete a housing or container which encloses the magnetic material 25, 35, hollow members 24, 34 and any fluid introduced therein.

The container of journal subassembly 20 for the magnetic material 25 is made up of outer shell member 21, inner shell member 22 and end ring wall member 23.

The container of bearing subassembly 30 for the magnetic material 35 is made up of outer shell member 31, inner shell member 32 and end ring wall members 33. The containers of subassemblies 20 and 30 are, preferably, made of a non-magnetic housing material and is used to mount and protect the passive magnetic material therein. The containers can be constructed of, for example, non-magnetic materials such as graphite/epoxy composites or non-magnetic metals such as austenitic stainless steel and titanium or plastics such as Teflon ® or nylon.

The containers of the assembled subassemblies 20 and 30 form an unoccupied volume including compartments 26 and 36, respectively, and a gap or space 27 and 37, respectively, which are filled with an incompressible fluid. The unoccupied volume in the containers means the volume enclosed within the inner and outer shells and the end ring wall members minus the volume occupied by the magnetic material. The unoccupied volume or space in the compartment 26 and 36 and gap 27 and 37 of the container is filled with a fluid, i.e., a gas or liquid, preferably a liquid having suitable damping properties such as viscosity and density and other characteristics such as non-reactivity, thermal expansion and bulk modulus for the operating temperatures and pressures of the magnetic bearing assembly 10. The fluid may be, for example, glycerine, oil, mineral oil, polyglycol and silicon-based fluids.

The fluid in the containers of subassemblies 20 and 30 dampens motion in the container walls and between the magnet and container walls. The fluid will help minimize container wall deflection resulting from the product-to-container interior pressure differential by means of its relatively high bulk modulus. Any change in the interior pressure of the container will result in a change in the volume of flexible hollow member. Unequal, thermally induce dimensional change in the container and enclosed magnet will result in a change in the fluid filled volume within the container. These changes, if not compensated for, results in deflection of the container walls — an unacceptable characteristic for a fluid film bearing.

The flexible hollow members 24 and 34 are preferably a tubular member made, for example, of a corrosive protective material such as a vinyl compound, for example, Tygon ® tubing, or a flexible bellows. The space in the hollow members 34 are filled with a compressible fluid such as an inert gas. The tubular members 24 and 34 are filled with gas such as nitrogen, argon or helium.

The change in volume in the containers of subassemblies 20 and 30 is accommodated by use of the relatively flexible gas filled tubular member 24 and 34. Depending on operating conditions, the tubes 24 and 34 is either pre-compressed or pre-expanded by elevating the tube's internal pressure. The desired effect from the change in volume due to thermal induced dimensional changes plus the change in volume due to internal pressure swings is a net zero movement in the container walls.

When installed, the magnetic bearing 10 will support a rotor in the magnetic field with no contact between the journal and bearing. After startup a hydrodynamic film develops as in a typical lubricated bearing. This fluid film supplies the damping necessary for smooth operation. The amount of damping required is application dependent. The added stiffness resulting from the magnetic forces causes relatively low bearing eccentricity. This coupled with increased clearances results in decreased damping.

The journal subassembly 20 is preferably attached to the shaft 50 by shrink fitting the housing material to the shaft such the journal subassembly 20 rotates with the shaft. The journal subassembly 20 can also be fastened to the shaft 50 by other conventional means such as by bolting, welding or gluing. In like manner, the bearing subassembly 30 may be attached to a magnetic bearing assembly housing 60 by shrink fitting the bearing housing material such that it snugly fits within the bearing housing 60. The bearing subassembly 30 can also be fastened to the bearing housing 60 by other conventional means such as by bolting, welding or gluing. The gap 40 formed between the journal 20 and bearing subassembly 30 is generally less than about 0.02 inch.

Figure 5:
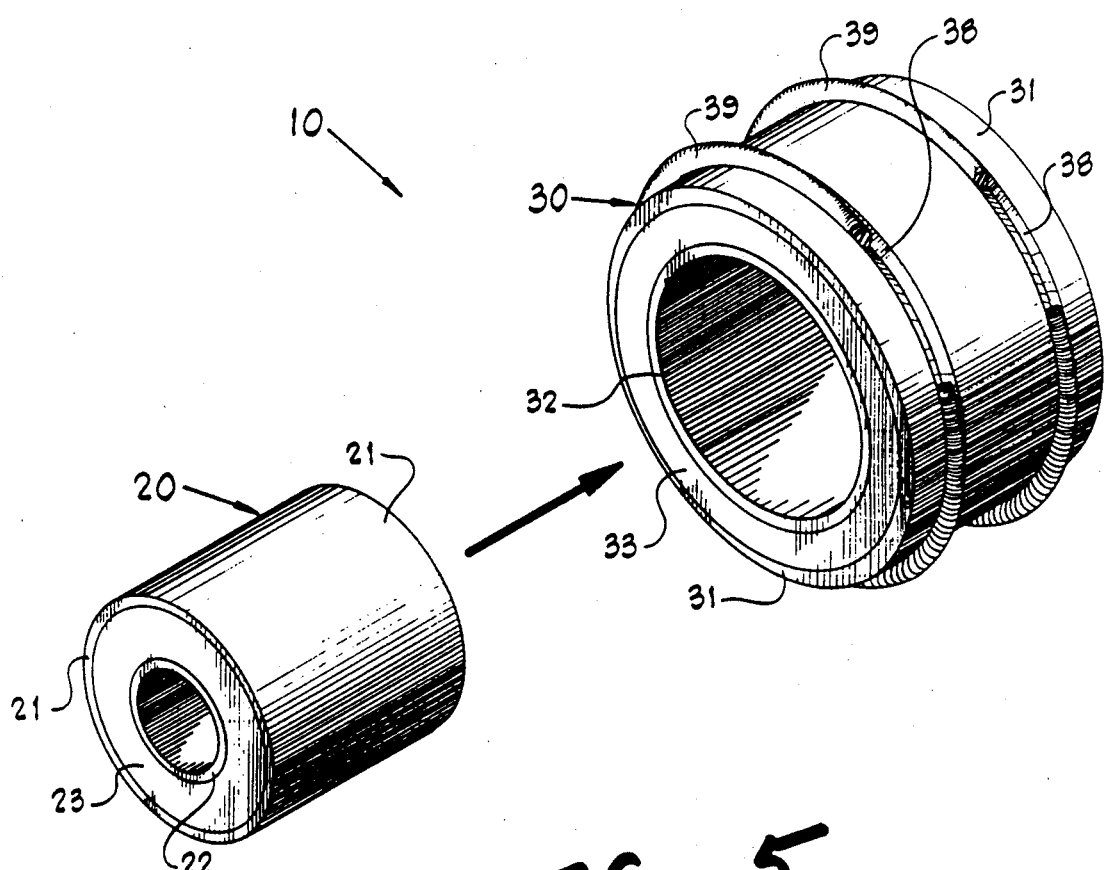
FIG. 5 is a perspective view showing an alternate embodiment of the container device of the present invention.

In a product filled environment, damping will be present in a hydrodynamic film. In some cases, this may not be enough damping, particularly when a combination of large clearances and low eccentricity allow insufficient damping to the magnetic bearing assembly 10. In such instances a squeeze film damper device using either product or an engineered, cooled fluid can be incorporated to supply additional damping. For example, in an alternate embodiment, a squeeze film damper can be placed on the outside diameter of the bearing subassembly 30. The alternate embodiment of the magnetic bearing assembly utilizing a squeeze damper is shown in FIG. 5, including an outer cylindrical shell member 31 containing grooves 38 and seal members 39. The seal members 39 may be, for example O-ring members.

The magnetic bearing assembly 10 is particularly utilized in sealless pumps such as in canned motor pumps and in magnetic drive pumps with operating temperatures such that the Curie temperature of the magnet, used in the assembly, is not exceeded. This temperature, for example, may be less than about 300 degrees centigrade for a neodymium-iron-boron magnetic material.

The magnetic assembly 10 is useful in corrosive environments. For example, when the product being pumped is liquid chlorine. The container of subassemblies 20 and 30 protects the magnetic material from contact with the corrosive fluid being pumped.

What is claimed is:

1. A passive magnetic bearing assembly for a rotating shaft comprising:
   a. a journal subassembly suitable for mounting to the shaft so as to rotate with the shaft, the journal subassembly comprising a housing forming a chamber containing a journal magnetic material, a flexible fluid-filled hollow member which compensates for changes in the unoccupied volume within the chamber due to thermal expansion and changes in internal pressure, and a damping fluid in the chamber; and
   b. a bearing subassembly annularly and concentrically disposed around the journal subassembly such that a clearance is formed between the bearing and journal subassemblies, the bearing subassembly comprising a housing forming a chamber containing a bearing magnetic material, a flexible hollow fluid-filled member which compensates for changes in the unoccupied volume within the chamber due to thermal expansion and changes in internal pressure, and a damping fluid in the chamber.

2. The passive magnetic bearing assembly of claim 1 wherein the housing comprises an inner and outer cylindrical shell concentrically arranged with side walls for forming an enclosure.

3. The passive magnetic bearing assembly of claim 2 wherein the housing is made of a non-magnetic material.

4. The passive magnetic bearing assembly of claim 1 wherein the flexible fluid-filled hollow member is a tubular member.

5. The passive magnetic bearing assembly of claim 4 wherein the tubular member is made of a vinyl compound.

6. The passive magnetic bearing assembly of claim 4 wherein the tubular member is a flexible bellows.

7. The passive magnetic bearing assembly of claim 1 wherein the flexible fluid-filled hollow member is filled with an inert gas.

8. The passive magnetic bearing assembly of claim 6 wherein the inert gas is selected from the group comprising nitrogen, argon and helium.

9. The passive magnetic bearing assembly of claim 1 wherein the dampening fluid is selected from the group comprising glycerine, mineral oil, oil polyglycol and silicon-based fluid.

10. The passive magnetic bearing assembly of claim 1 wherein the magnetic material is selected from the group comprising a rare earth/iron alloy and a ceramic.

* * * * *